Nov. 18, 1958     W. A. RHODES ET AL     2,860,850
SOLENOID VALVE
Filed May 25, 1953                               2 Sheets-Sheet 2
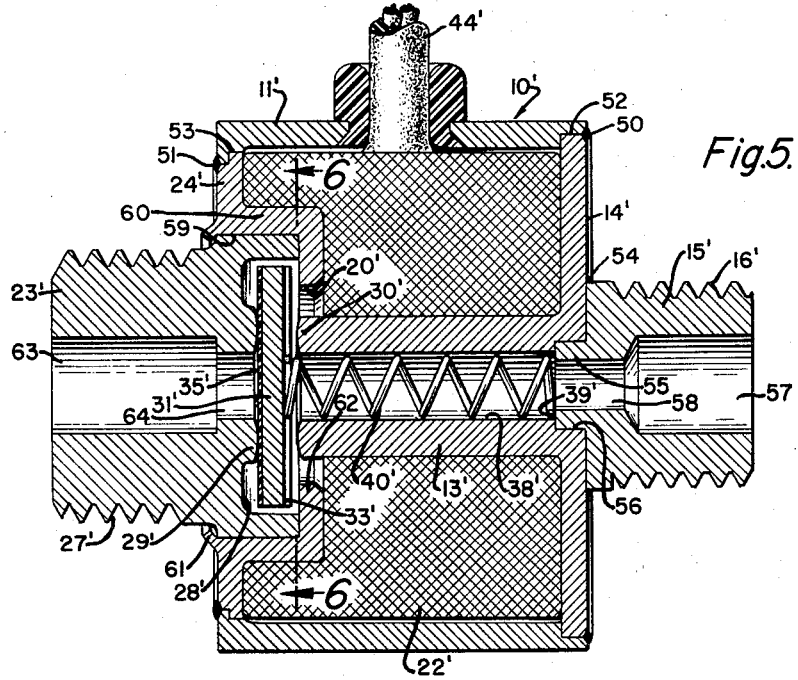
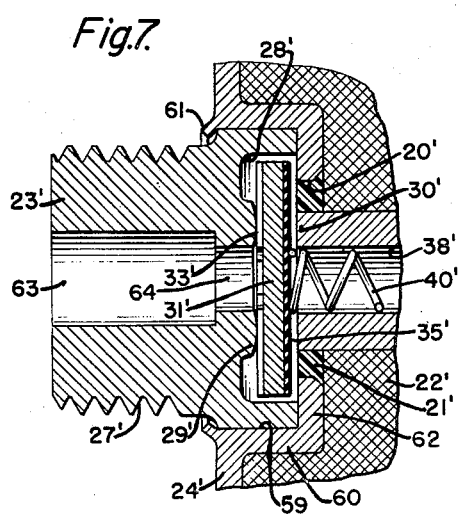
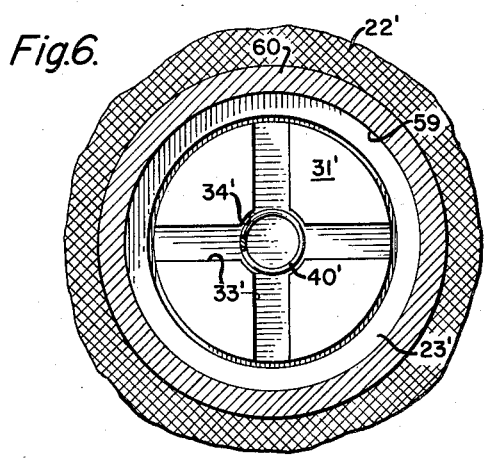
HARRY E. ETCHES,
WILLIAM A. RHODES,
INVENTOR.
BY *John H. F. Wallace*

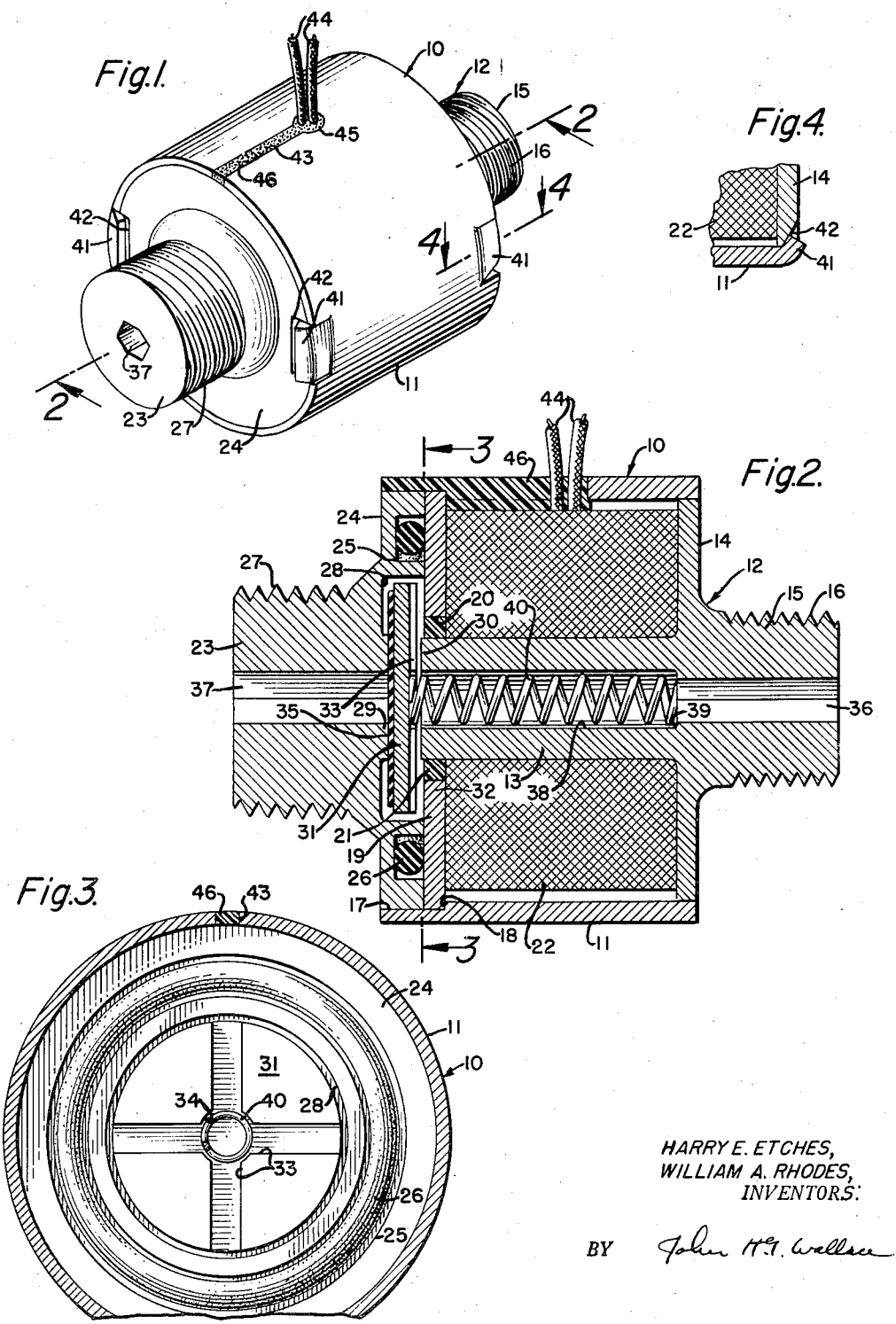

United States Patent Office 2,860,850
Patented Nov. 18, 1958

2,860,850

SOLENOID VALVE

William A. Rhodes, Phoenix, and Harry E. Etches, Mesa, Ariz., assignors to The Garrett Corporation, Los Angeles, Calif., a corporation of California Application May 25, 1953, Serial No. 357,142

11 Claims. (Cl. 251—139)

The present invention relates generally to valves and more particularly to electromagnetically operated fluid valves.

Heretofore, considerable difficulty has been experienced with electromagnetically operated fluid valves, as full use has not been made of the available electromagnetic energy produced by a coil winding. It has been found that, in such prior devices, the effective electromagnetic force being applied to the armature of the valve is frequently diminished as the valve approaches the end of its coerced travel. Furthermore, the fluid flow path characteristics of such prior devices have been inadequate to permit a relatively uninterrupted and smooth fluid flow through the valve.

It is therefore an object of the present invention to provide a novel electromagnetically operated fluid valve that will overcome the aforementioned difficulties experienced with prior devices.

Another object of the present invention is to provide a novel electromagnetically operated valve that is extremely compact, relatively simple in design, and efficient in operation.

A further object of the invention is to provide a novel combination armature and valve member for an electromagnetically operated valve provided with an improved electromagnetic flux path to utilize most efficiently the electromagnetic energy available from the coil winding.

Another object of the present invention is to provide an electromagnetically operated pneumatic valve incorporating a combination armature and valve member which permits relatively easy and rapid changeover of said valve from a normally open to a normally closed condition or vice versa.

A still further object of the present invention is to provide a novel manner of assembly for an electromagnetically operated valve.

A further object of the invention is to provide an electromagnetically operated valve having novel means for installation of said valve in a fluid control system.

Other and further important objects of the invention will become apparent from the disclosures in the following detailed description, appended claims, and accompanying drawings, wherein:

Fig. 1 is an isometric view of the electromagnetically operated fluid valve of the present invention;

Fig. 2 is a longitudinal sectional view of the electromagnetic valve, taken substantially as indicated by line 2—2, Fig. 1;

Fig. 3 is a transverse sectional view showing the combination armature valve member taken substantially as indicated by line 3—3, Fig. 2;

Fig. 4 is a fragmentary sectional view of the attachment means intermediate the valve casing and the end closure members and taken substantially as indicated by line 4—4, Fig. 1;

Fig. 5 is a longitudinal sectional view similar to Fig. 2 and showing a modified form of the present electromagnetically operated valve;

Fig. 6 is a transverse sectional view, similar to Fig. 3, showing the valve member and armature of the modified electromagnetic valve of Fig. 5 and taken substantially as indicated by line 6—6, Fig. 5; and Fig. 7 is a fragmentary sectional view of a portion of the electromagnetic valve of Fig. 5 and showing the combination armature and valve member in a reversed, that is, normally open, position.

Referring primarily to Figs. 1 and 2 of the drawings, the electromagnetically operated fluid valve of the present invention is shown as indicated generally at 10. The valve comprises an outer housing 11 that is substantially cylindrical with relatively thin walls. A core, indicated generally at 12, is positioned axially within the housing 11. The core 12 comprises a centrally disposed shaft portion 13 that extends axially through the cylindircal casing 11 to a point spaced from one end thereof. An end closure member, in the form of a circular flange 14, is disposed outwardly from the portion 13 and the periphery thereof is adapted is adapted to engage the inner wall of the facing 11. A nipple or conduit attachment member 15 is formed integrally with and extends axially outwardly from the flange 14, this member being provided with external threads 16 for assembling the present valve in position for use.

The cylindrical casing 11 is counterbored as at 17 adjacent one end thereof thus presenting a shoulder 18 against which a radially extending washer 19 is adapted to be positioned. The washer 19 is generally circular and has a centrally disposed circular opening 20. The core 12, together with the housing 11 and the washer 19, are adapted to be made from any suitable magnetic material such as iron or the like in order to provide an electromagnetic flux path with suitable operating characteristics. The wall around opening 20 is spaced from the outer surface of the shaft portion 13 to thus provide an electromagnetic gap, this gap being closed for fluid sealing purposes by means of a suitable elastomeric ring 21.

An electromagnetic coil winding 22 is disposed and wound about the shaft portion 13 of the core and retained in position thereon by means of the flange 14 and the washer 19.

A second nipple or conduit attachment member 23, similar to the member 15, is provided with a flange 24 that is adapted to be received in the counterbore 17 and positioned in contact with the end surface of the washer 19. The member 23 is constructed from any suitable non-magnetic material such as aluminum alloy, for example. The flange 24 has an annular, inwardly directed groove 25 in which a suitable elastomeric sealing ring 26 is adapted to be positioned. The ring 26 is adapted to engage the outer surface of the washer 19 to thereby provide a seal between the atmosphere and the operating mechanism of the valve. The attachment member 23 is provided with suitable external threads 27, on the periphery thereof, for attachment to a point of use of the electromagnetically operated valve. The inner end of the attachment member 23 is provided with an annular groove or recess 28 that has a centrally disposed axially extending portion 29, the portion 29 being in spaced relationship with an end 30 of the core member 13.

A combination valve member and armature 31 of magnetic material is positioned in the space provided intermediate a radially extending inner portion 32 of the washer 19 and the recess 28. The armature valve 31 is in the form of a circular plate having radially extending grooves 33 formed in one of the surfaces thereof. The grooves 33 extend toward the center of the armature-valve member 31 and terminate in a circular cutout 34, Fig. 3. The opposite surface of the member surface 31 may be provided, for example, with a coating 35 of a suitable resilient or elastomeric material such as, for example, "Teflon," plastic, rubber or the like. The portion 29 of the attachment member 23 provides a seat for the armature-valve member 31.

A plurality of axially disposed registering passages are provided through the attachment members 15 and 23. These passages, indicated at 36 and 37, are preferably made hexagonal, in cross section so as to enable reception of a wrench to prevent rotation of the valve during assembly in a suitable system for use. The passages 36 and 37 are coaxial with the passage 38 formed in the shaft portion 13 of the core 12. The passage 38 is slightly larger in diameter than the passage 36 thereby presenting a shoulder 39 at the junction of the two passages. A compression spring 40 is adapted to be positioned in the passage 38 intermediate the shoulder 39 and the central cutout portion 34 of the armature-valve member 31 which will be normally maintained against the seat 29 by means of the compression spring 40.

The housing 11 is provided with diametrically spaced tabs 41 (Figs. 1 and 4) at each end thereof, these tabs being adapted to register with and to be bent into suitable notches 42 formed in the outer surfaces of the flange 14 and flange 24 respectively. The housing 11 is also provided with a longitudinal slot 43 to enable insertion of wires 44 leading to the coil winding 22. Upon completion of the assembly of the valve, the slot 43, together with an enlarged circular inner end 45, may be filled with any suitable sealing material such as, for example, rosin, shellac, or the like.

In use, it will be seen that the electromagnetic flow path is particularly advantageous in the present structure due to the relatively close position of the end portion 30 of the shaft core structure 13 and the radially inner portion 32 of the washer 19, the armature-valve member 31 being adapted to extend radially outwardly over the adjacent portions of the washer 19; the inner end 30 of the shaft core member 13 and over the electromagnetic gap sealed by the ring 21; to thus provide an electromagnetic valve operating device wherein the force of the electromagnetic attraction is substantially constant over the entire range of movement of the armature-valve member 31. Upon energization of the winding 22, the armature-valve member 31 will be attracted toward the end 30 of the shaft core member 13, to thereby withdraw its resilient portion 35 from the valve seat 29, thus permitting fluid flow through the passages 36, 38, recess 28, and passage 37.

The subject valve is shown as being normally closed; however, the armature-valve member 31 need only be reversed in position or turned over to provide a normally open valve. When the member 31 is reversed, the surface thereof intermediate the grooves 33 will normally rest upon the previously utilized valve seat 29 and the resilient face 35 of the armature-valve member would be positioned adjacent the end 30 of the shaft core 13 which now forms the valve seat. Upon energization of the electromagnetic coil winding 22, the armature-valve member will be drawn toward the end 30; this end now forming a seat for the armature-valve member to thus close the communication between the passage 38 and the passage recess 28.

In Figs. 5, 6, and 7 a modification of the invention is shown wherein like parts are indicated by primed reference numerals. In this modification, flanges 14' and 24' respectively are secured to a housing 11' as by welding, brazing, or the like, indicated generally at 50 and 51. In order to provide for accurate assembly, the outer peripheries of the flanges 14' and 24' engage in suitable grooves formed as annular notches or ledges 52 and 53 in the housing portion 11'.

Attachment members 15' and 23' are separate from the closure members formed by the flanges 14' and 24', the attachment member 15' being secured to the flange 14' as by suitable welding or brazing 54, a tubular extension 55 thereon extending into a bore 56 in the flange 14. The inner end of the tubular extension 55 provides a necessary shoulder 39' for seating one end of a compression spring 40'. The attachment member 15' is further provided with an axial bore 57 which communicates with a co-extensive axial bore 58 of reduced diameter, this latter bore communicating with a bore 38' in a shaft core member 13'.

The attachment member 23' is adapted to be received in an annular bore 59 formed in the flange 24' and in an axially extending portion 60 which extends into and is adapted to be surrounded by electromagnetic coil winding 22'. An annular tab 61, formed on the flange 24', is adapted to be rolled inwardly to engage the attachment member 23' to secure this attachment member in the bore 59.

The axially extending portion 60 of the flange 24' has a radially inwardly extending flange section 62 with an inner surface 20' that is spaced radially from the inner end 30' of the shaft core member 13' to thus provide an electromagnetic gap therebetween.

The attachment member 23' is provided with an axial bore 63 which communicates with a reduced diameter axial bore 64, the bore 64 being in communication with an enlarged annular recess 28' in which an armature-valve member 31' is adapted to be positioned.

The operation of the modification of the valve of Figs. 5, 6, and 7 is substantially the same as that of the form of the valve indicated in Figs. 1 through 4, the axially extending portion 60 and the radially inwardly extending flange 62 being considered, for descriptive purposes, a secondary core means and the shaft member 13' being considered the primary core means.

In Fig. 7, the modified valve of Figs. 5 and 6 is shown as having its armature-valve member 31' reversed in order to provide a normally open valve in a manner similar to that described in connection with the valve of Figs. 1 through 4.

We claim:

1. An electromagnetic valve comprising: a casing; core means disposed axially within said casing and having a free end; an electromagnetic winding disposed about said core means; end closure members associated with said core means and forming a part of said casing, an electromagnetic gap being formed intermediate said free end of said core means and one of said closure members; conduit attachment members associated with each of said end closure members, one of said attachment members adjacent said free end of said core means being of non-magnetic material and spaced from said free end of said core means; axially extending passage means formed in said core means, said closure members and said attachment members; a reversible circular armature-valve member of magnetic material positioned intermediate said free end of said core means and said non-magnetic attachment member, said armature-valve member being adapted to extend radially outwardly beyond said electromagnetic gap; valve seats formed on the facing ends of said non-magnetic attachment member and said core means, said armature-valve member being adapted to be moved in one direction relative to one of said valve seats by energization of said winding; and means for biasing said armature-valve member in another direction relative to said one of said valve seats upon deenergization of said winding.

2. An electromagnetic valve comprising: a casing; core means disposed axially within said casing and having a free end; an electromagnetic winding disposed about said core means; end closure members associated with said core means and forming part of said casing, an electromagnetic gap being formed intermediate said free end of said core means and one of said closure members; conduit attachment members associated with each of said end closure members, one of said attachment members adjacent said free end of said core means being of non-magnetic material and spaced from said free end of said core means; axially extending communicating passage means formed in said core means, said closure members and said attachment members; a reversible circular armature-valve member of magnetic material and positioned intermediate said free end of said core means and said non-magnetic attachment member, said armature-valve member being adapted to extend radially outwardly beyond said electromagnetic gap; valve seats formed on the facing ends of said non-magnetic attachment member and said core means, said armature-valve member being adapted to be moved in one direction relative to one of said valve seats by energization of said winding; and a compression spring disposed in said passage means of said core means for normally urging said armature-valve member in another direction relative to said one of said valve seats.

3. An electromagnetic valve comprising: a casing; core means disposed axially within said casing and having a free end; an electromagnetic winding disposed about said core means; end closure members associated with said core means and forming part of said casing, an electromagnetic gap being formed intermediate said free end of said core means and one of said closure members; conduit attachment members associated with each of said end closure members, one of said attachment members adjacent said free end of said core means being of non-magnetic material and spaced from said free end of said core means; axially disposed passage means formed in said core means, said closure members and said attachment members; a reversible circular armature-valve member of magnetic material and positioned intermediate said free end of said core means and said non-magnetic attachment member, said armature-valve member being adapted to extend radially outwardly beyond said electromagnetic gap; radially extending passages formed in one axial surface of said armature-valve member; valve seats formed on the inner ends of said non-magnetic attachment member and said core means, the surface of said armature-valve member remote from said surface containing said radially extending passages being adapted to be moved in one direction relative to one of said valve seats upon energization of said winding; and means for biasing said armature-valve member in another direction relative to said one of said valve seats upon deenergization of said winding.

4. An electromagnetic valve comprising: a casing; core means disposed axially within said casing and having a free end; an electromagnetic winding disposed about said core means; end closure members associated with said core means and forming part of said casing, an electromagnetic gap being formed intermediate said free end of said core means and one of said closure members; conduit attachment members associated with each of said end closure members, one of said attachment members adjacent said free end of said core means being of non-magnetic material and spaced from said free end of said core means; axially disposed passage means formed in said core means, said closure members and said attachment members; a reversible circular armature-valve member of magnetic material and positioned intermediate said free end of said core means and said non-magnetic attachment member, said armature-valve member being adapted to extend radially outwardly beyond said electromagnetic gap; radially extending passages formed in one axial surface of said armature-valve member; valve seats formed on the facing ends of said non-magnetic attachment member and said core means, the surfaces of said armature-valve member remote from said surface containing said radially extending passages being adapted to be moved into engagement and disengagement with one of said valve seats; and a compression spring disposed in said passage means in said core means for normally urging said armature-valve member into engagement with said one of said valve seats.

5. An electromagnetic valve comprising: a casing; core means disposed axially within said casing and having a free end; an electromagnetic winding disposed about said core means; end closure members associated with said core means and forming part of said casing, an electromagnetic gap being formed intermediate said free end of said core means and one of said closure members; conduit attachment members associated with each of said end closure members, one of said attachment members adjacent said free end of said core means being of non-magnetic material and spaced from free end of said core means; axially disposed passage means formed in said core means, said closure members and said attachment members; a reversible circular armature-valve member of magnetic material and positioned intermediate said free end of said core means and said non-magnetic attachment members, said armature-valve member being adapted to extend radially outwardly beyond said electromagnetic gap; radially extending passages formed in one axial surface of said armature-valve member; valve seats formed on the facing ends of said non-magnetic attachment member and said core means, the surfaces of said armature-valve member remote from said surface containing said radially extending passages being provided with a resilient surface coating and adapted to be moved into engagement and disengagement with one of said valve seats; and a compression spring disposed in said passage means in said core means for normally urging said armature-valve member into engagement with said one of said valve seats.

6. An electromagnetic valve comprising in combination: a casing; a primary core disposed axially through a portion of the length of said casing; a secondary core of a larger diameter than said primary core and disposed axially through another portion of said casing, the inner end of said secondary core being spaced radially outwardly from the inner end of said primary core to form an electromagnetic gap intermediate said inner ends of said cores; an electromagnetic winding disposed about said cores; a conduit attachment member positioned in co-operation with said secondary core, the inner end thereof being spaced from the inner end of said primary core; axially disposed passages formed in said primary core and said attachment member; a reversible circular armature-valve member of magnetic material and positioned intermediate the inner ends of said primary core and said attachment member, said armature-valve member being adapted to extend radially outwardly beyond and overlie said electromagnetic gap; valve seats formed on the inner ends of said primary core and said attachment member, said armature-valve member being adapted to co-operate with one of said valve seats; and means for biasing said armature-valve member in one direction relative to said one of said valve seats.

7. An electromagnetic valve comprising in combination: a casing; a primary core disposed axially through a portion of the length of said casing; a secondary core of a larger diameter than said primary core and disposed axially through another portion of said casing, the inner end of said secondary core being positioned and spaced radially outwardly from the inner end of said primary core to form an electromagnetic gap intermediate said inner ends of said cores; an electromagnetic winding disposed about said cores; a conduit attachment member positioned in co-operation with said secondary core, the inner end thereof being spaced from the inner end of said primary core; axially disposed passages formed in said primary core and said attachment member; a reversible circular armature-valve member of magnetic material positioned intermediate the inner end of said primary core and said attachment member, said armature-valve member being adapted to extend radially outwardly beyond and overlie said electromagnetic gap; valve seats formed on the inner ends of said primary core and said attachment member, said armature-valve member being adapted for cooperation with one of said valve seats; and a compression spring disposed in said passage in said primary core for normally urging said armature-valve member into engagement with said one of said valve seats.

8. An electromagnetic valve comprising in combination: a casing; a primary core disposed axially through a portion of the length of said casing; a secondary core having a larger diameter than said primary core and disposed axially through another portion of said casing, the inner end of said secondary core being spaced radially outwardly from the inner end of said primary core to form an electromagnetic gap intermediate said inner ends of said cores; an electromagnetic winding disposed about said cores; a conduit attachment member positioned in association with said secondary core, the inner end thereof being spaced from the inner end of said primary core; axially disposed passages formed in said primary core and said attachment member; a reversible circular armature-valve member of magnetic material positioned intermediate the inner ends of said primary core and said attachment member, said armature-valve member being adapted to extend radially outwardly beyond and overlie said electromagnetic gap; radially extending passages formed in one plane surface of said armature-valve member; valve seats formed on the inner ends of said primary core and said attachment member, the surface of said armature-valve member remote from said surface containing said radially extending passages being adapted to be moved into engagement and disengagement with one of said valve seats and means for biasing said armature-valve member in one direction.

9. An electromagnetic valve comprising in combination: a casing; a primary core disposed axially through a portion of the length of said casing; a secondary core of a larger diameter than said primary core and disposed axially through another portion of said casing, the inner end of said secondary core being spaced radially outwardly from the inner end of said primary core to form an electromagnetic gap intermediate said inner ends of said cores; an electromagnetic winding disposed about said cores; a conduit attachment member positioned in association with said secondary core, the inner end thereof being spaced from the inner end of said primary core; axially disposed passages formed in said primary core and said attachment member; a reversible circular armature-valve member of magnetic material positioned intermediate the inner ends of said primary core and said attachment member, said armature-valve member being adapted to extend radially outwardly beyond and overlie said electromagnetic gap; radially extending passages formed in one plane surface of said armature-valve member; valve seats formed on the inner ends of said primary core and said attachment member, the surface of said armature-valve member remote from said surface containing said radially extending passages being adapted to be moved from engagement with one of said valve seats upon energization of said winding; and a compression spring disposed in said passage in said primary core for normally urging said armature-valve member into engagement with said one of said valve seats.

10. An electromagnetic valve comprising in combination: a casing; a primary core disposed axially through a portion of the length of said casing; a secondary core of a larger diameter than said primary core and disposed axially through another portion of said casing, the inner end of said secondary core being spaced radially outwardly from the inner end of said primary core to form an electromagnetic gap intermediate said inner ends of said cores; an electromagnetic winding disposed about said cores; a conduit attachment member positioned in association with said secondary core, the inner end thereof being spaced from the inner end of said primary core; axially disposed passages formed in said primary core and said attachment member; a reversible circular armature-valve member of magnetic material positioned intermediate the inner ends of said primary core and said attachment member, said armature-valve member being adapted to extend radially outwardly beyond said electromagnetic gap; radially extending passages formed in one plane surface of said armature-valve member; valve seats formed on the inner ends of said primary core and said attachment member, the surface of said armature-valve member remote from said surface containing said radially extending passages being provided with a resilient surface coating and adapted to be moved from engagement with one of said valve seats upon energization of said winding and a compression spring disposed in said passage in said primary core for normally urging said armature-valve member into engagement with one of said valve seats.

11. In an electromagnetic valve having a casing surrounding an electromagnetic winding, an axially disposed core and an armature: lead-in wires for said winding; a longitudinal slot in said casing, said wires being adapted to be inserted through said slot during assembly of said valve; closure members positioned in the ends of said casing and having peripheral notches; tabs adapted to be bent from said casing and into said notches for retaining said closure members in place; and a sealing material positioned in said slot after final assembly of said valve.

References Cited in the file of this patent

UNITED STATES PATENTS

| 1,664,613 | French | Apr. 3, 1928 |
| 1,854,305 | Hapgood | Apr. 19, 1932 |
| 1,914,123 | Hapgood | June 13, 1933 |
| 2,289,310 | Steel | July 7, 1942 |
| 2,607,368 | Mayer | Aug. 19, 1952 |
| 2,616,452 | Clay | Nov. 4, 1952 |

FOREIGN PATENTS

| 566,211 | Great Britain | Dec. 19, 1944 |
| 615,997 | Great Britain | Jan. 14, 1949 |